United States Patent [19]

Leon et al.

[11] Patent Number: 4,582,670
[45] Date of Patent: Apr. 15, 1986

[54] COUNTING SYSTEM FOR RADIOACTIVE FLUIDS

[75] Inventors: Joseph Leon, Fox Point; Lloyd E. Eater, Oconomowoc, both of Wis.

[73] Assignee: Sentry Equipment Corporation, Oconomowac, Wis.

[21] Appl. No.: 410,926

[22] Filed: Aug. 24, 1982

[51] Int. Cl.⁴ .............................................. G21C 17/00
[52] U.S. Cl. ................................... 376/245; 376/253; 376/256
[58] Field of Search ........ 376/245, 253, 256, 340–345; 250/428–432 R

[56] References Cited

U.S. PATENT DOCUMENTS

| | | | |
|---|---|---|---|
| 3,121,789 | 2/1964 | McGrath | 250/432 R |
| 3,376,200 | 4/1968 | Ward | 376/245 |
| 3,849,655 | 11/1974 | Martucci | 250/432 R |
| 4,072,559 | 2/1978 | Neidl et al. | 376/253 |
| 4,095,541 | 3/1978 | Neidl | 376/245 |
| 4,107,533 | 8/1978 | Tabuchi et al. | 376/245 |
| 4,446,097 | 5/1984 | Calabrese et al. | 376/256 |

Primary Examiner—Salvatore Cangialosi
Attorney, Agent, or Firm—Michael, Best & Friedrich

[57] ABSTRACT

The counting system includes a portable gamma ray detector having a detecting portion electrically connected to instrumentation for analyzing the radioactivity of nuclear reactor fluids, a radiation shielded panel including a plurality of openings for receiving the detecting portion of the detector, and sample vessels for receiving a radioactive fluid located behind the panel. Samples of radioactive fluids such as reactor coolant, reactor coolant off-gas and containment air, are selectively introduced into the sample vessels. The reactor coolant is cooled, de-pressurized and de-gassed and the off-gas and the liquid are routed to separate sampling vessels. The radioactivity of the radioactive fluid contained in each sample vessel is determined by simply inserting the detecting portion of the detector into a corresponding panel opening. Radiation shielded plugs are inserted into each of unused panel openings to shield the operator against radiation.

12 Claims, 13 Drawing Figures

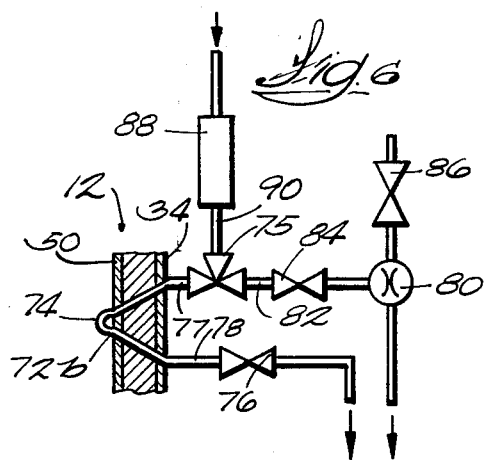
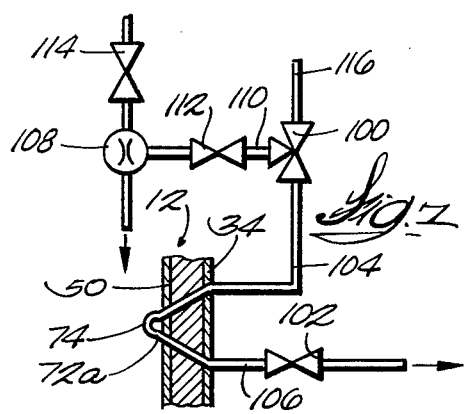
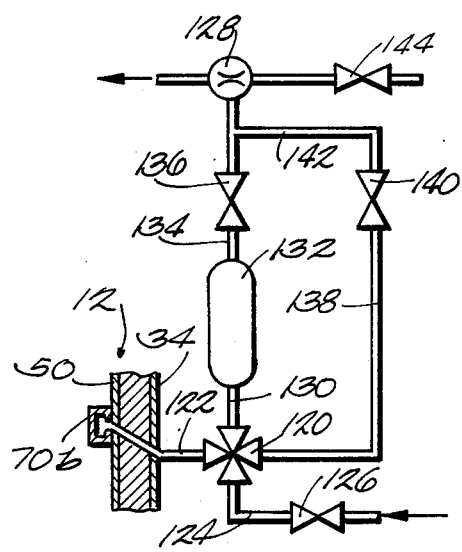
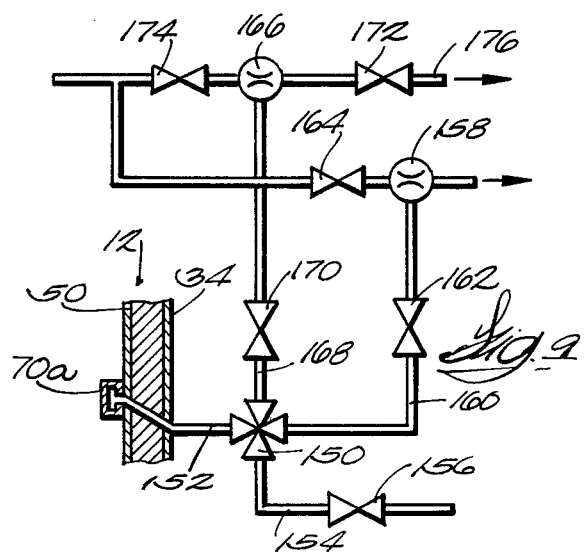
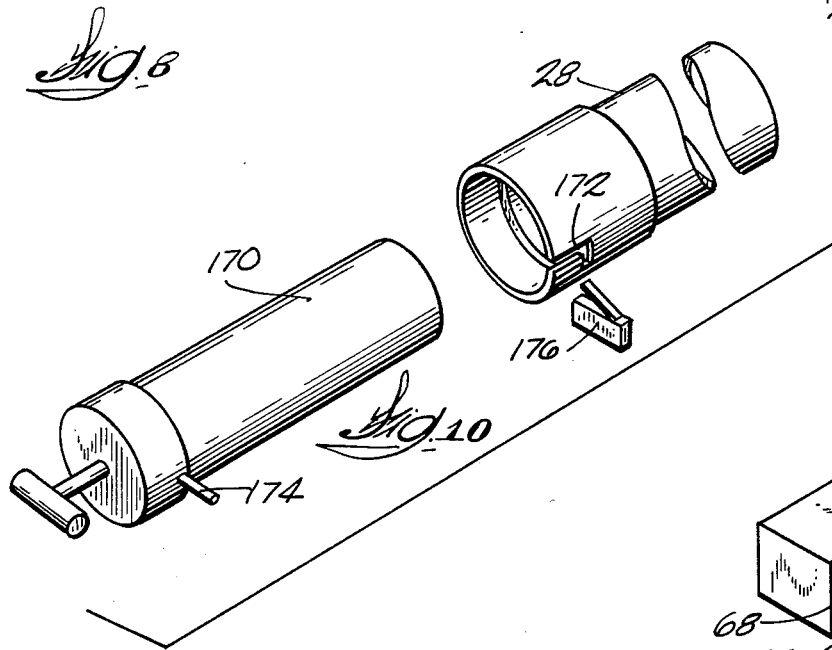
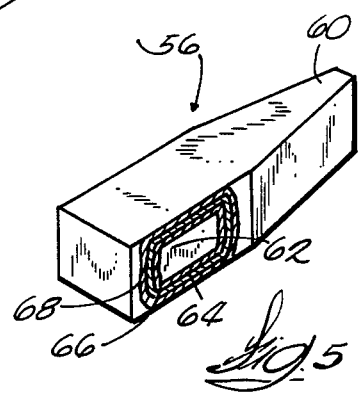

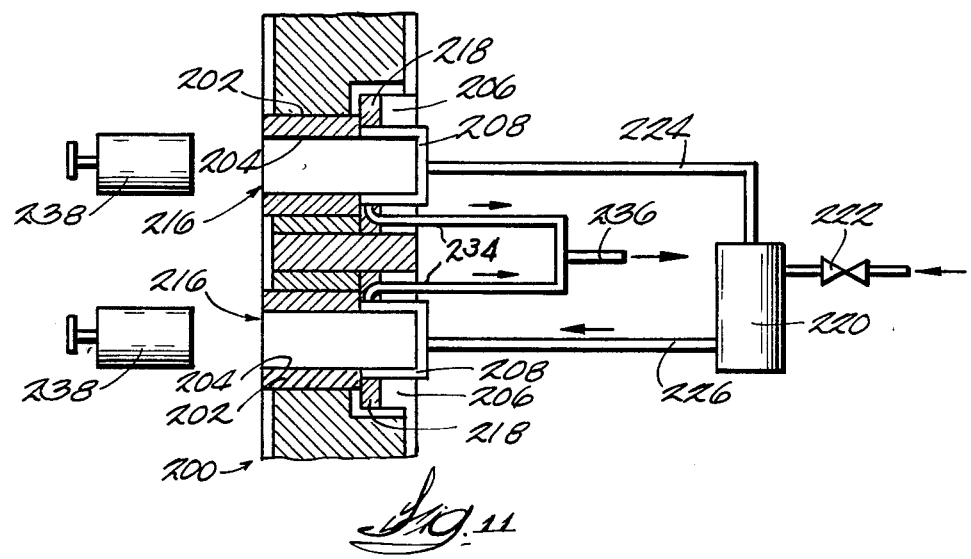
Fig. 11
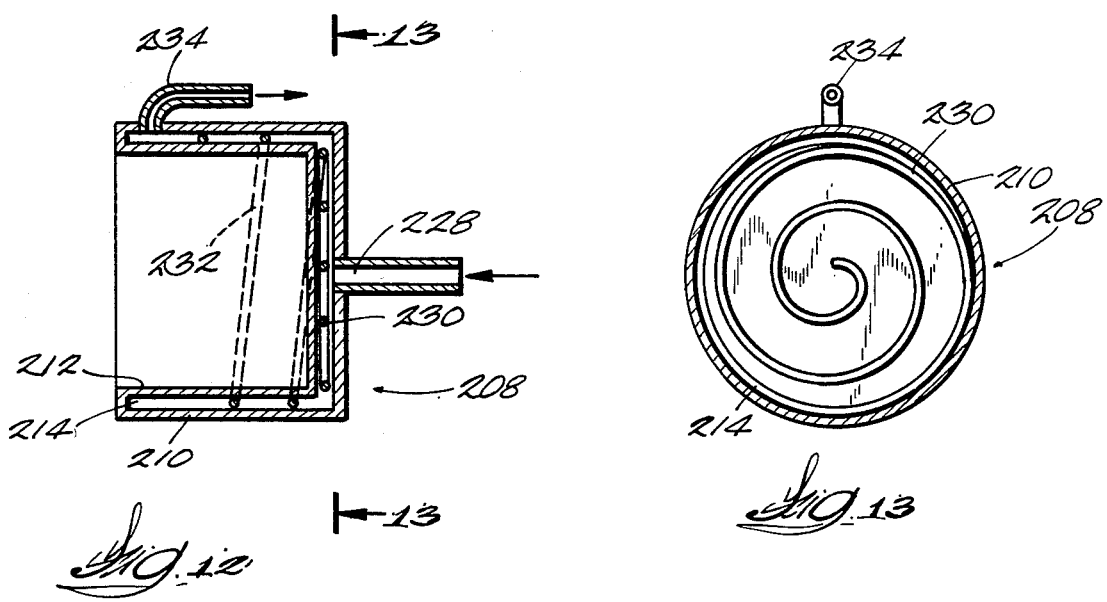
Fig. 12
Fig. 13

COUNTING SYSTEM FOR RADIOACTIVE FLUIDS

BACKGROUND OF THE INVENTION

This invention relates to counting system for radioactive fluids and, more particularly, to such systems adapted to analyze various fluids in a nuclear power plant during post accident conditions and/or normal operation.

Radioactively "hot" fluid samples from a nuclear reactor in the event of an accident usually affects the accuracy of the equipment used for analysis in the counting room during normal operation. Consequently, some type of on-line analyzing system is highly desirable for this purpose. Prior on-line systems for analyzing radioactive fluids in nuclear power plants typically use one or more of the following features: (1) a movable, variable collimator and a fixed sample position or multiple sample positions, (2) an uncollimated fixed sample position with a fixed geometry and variable source concentration and/or (3) uncooled, pressurized reactor coolant samples.

Variable collimation usually means a change in geometry and detector efficiency and variable sample positions or sample volume requires changes in geometry efficiency and/or the detector efficiency. These variables require special calibration techniques. Variable collimators are quite large and heavy. Since the area in which the counting system is located may be exposed to relatively high concentrations of radioactivity, prior on-line systems typically are power driven and at least partially automatic in order to protect the operator against the excessive radiation doses. Consequently, the resulting complex systems are relatively expensive and have low reliability.

While being transported to a sample station, high pressure, high temperature liquid samples, such as nuclear reactor coolant, tend to become cooled and degas to produce two-phase flow which affects accuracy of the measured radioactivity.

SUMMARY OF THE INVENTION

A principal object of the invention is to provide a counting system for radioactive fluids including fixed sample positions and fixed geometry which are simply constructed and highly reliable.

Another object of the invention is to provide a counting system for radioactive fluids of a nuclear power plant including gamma ray detecting means which is available for use in post accident analysis and normal operating analysis in the counting room or other locations.

Another object of the invention is to provide a counting system defined in the immediately preceding paragraph which can be safely operated by relatively unskilled personnel.

Another object of the invention is to provide a counting system for radioacitve fluids having control arrangements for conveniently transporting gas and liquid samples to a sample position and convenient clean up and including simple, reliable components.

Another object of the invention is to provide a method for analyzing radioactive fluids wherein high pressure, high temperature liquids are cooled and depressurized before analysis and off-gases are separated from the liquid for separate analysis.

Other objects, aspects and advantages of the invention will become apparent to those skilled in the art upon reviewing the following description, the drawings and the appended claims.

The counting system provided by the invention includes a portable gamma ray detector having a detecting portion and a radiation shielded panel including a plurality of openings for receiving the detecting portion of the detector. Sample vessels for receiving a radioactive fluid samples are located behind the panel and radioactive fluids are selectively introduced into the sample vessels. The detector is electrically connected to instrumentation for analyzing the radioactivity of a radioactive fluid. The radioactivity of a radioactive fluid contained in each of the sample vessels can be determined by simply inserting the detecting portion of the detector into the corresponding panel openings and moving from one opening to another. Radiation shielded plugs are inserted into each of unused panel openings to shield the operator against radiation.

High pressure, high temperature radioactive fluids, such as nuclear reactor coolant, are cooled, de-pressurized, and the off-gas stripped therefrom before introduction into the sample vessels. The off-gas and liquid are introduced into separate sample vessels and analyzed independently by the detector.

In one embodiment adapted for use in post accident analysis, a radiation shielded cave assembly is mounted on the rear of the panel and has an interior shell defining a rearwardly extending chamber encompassing the panel openings. The cave assembly includes a plurality of sampling port-defining members which extend through the chamber and are arranged to define radiation isolated sampling ports. The rear portion of the sampling port-defining members preferably is wedge-shaped so as to minimize streaming of radiation from one sampling port to another. These members preferably include a lead core covered by an intermediate sheet of copper and an outer sheet of cadmium to minimize interference from lead fluorescence.

In another embodiment adapted for use in analysis during normal operation, the sample vessels are in the form of a Marinelli-like beaker and are mounted on the panel to form part of a sampling port into which the detector is inserted. A continuous flow of cooled, depressurized reactor coolant is introduced into a dynamic degassifier to separate the gas bubbles from the liquid. The separate off-gas and liquid streams from the degassifier are introduced into and flow through different sample vessels. The sample vesles are arranged to promote spiral flow therethrough in order to minimize flow blockage by any gas present in the liquid sample stream or by any liquid present in the off-gas sample stream.

BRIEF DESCRIPTION OF THE DRAWINGS

FIG. 5 is a perspective view, partially broken away, of a sampling port-defining member.

FIG. 6 is a diagrammatic illustration of the fluid control system for introducing a sample of diluted reactor coolant into a sample vessel in the cave assembly for analysis.

FIG. 7 is a diagrammatic illustration of the fluid control system for introducing a sample of undiluted reactor coolant into a sample vessel in the cave assembly for analysis.

FIG. 8 is a diagrammatic illustration of the fluid control system for introducing a sample of off-gas from the reactor coolant into a sample vessel in the cave assembly for analysis.

FIG. 9 is a diagrammatic illustration of the fluid control system for introducing a sample of the containment air from the nuclear reactor into a sample vessel in the cave assembly for analysis.

FIG. 10 is an enlarged, exploded perspective view of a plug and a sample panel sleeve which receives the plugs and the detector.

FIG. 11 is a diagrammatic illustration of an alternate sample panel adapted for use in analyzing the reactor coolant during normal operation.

FIG. 12 is an enlarged, sectional view of a sampling vessel for degassed reactor coolant.

FIG. 13 is a sectional view taken generally along line 13—13 in FIG. 12.

DESCRIPTION OF THE PREFERRED EMBODIMENTS

Figure 1:
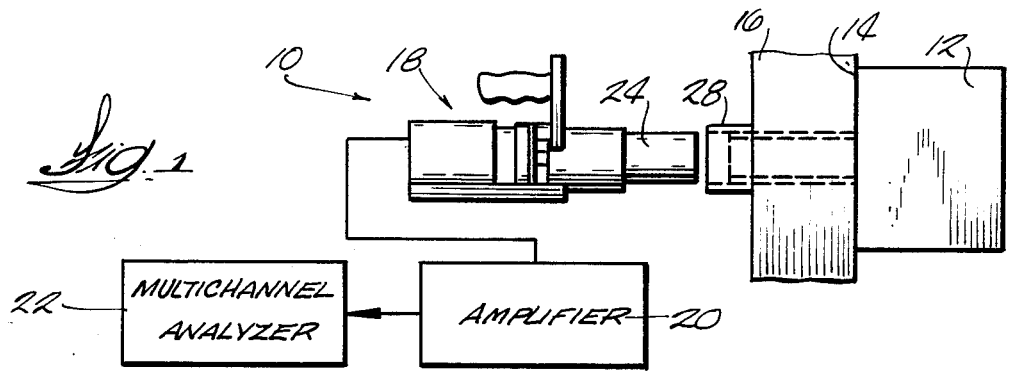
FIG. 1 is a diagrammatic illustration of a counting syste for radioactive fluids embodying the invention.
Figure 2:
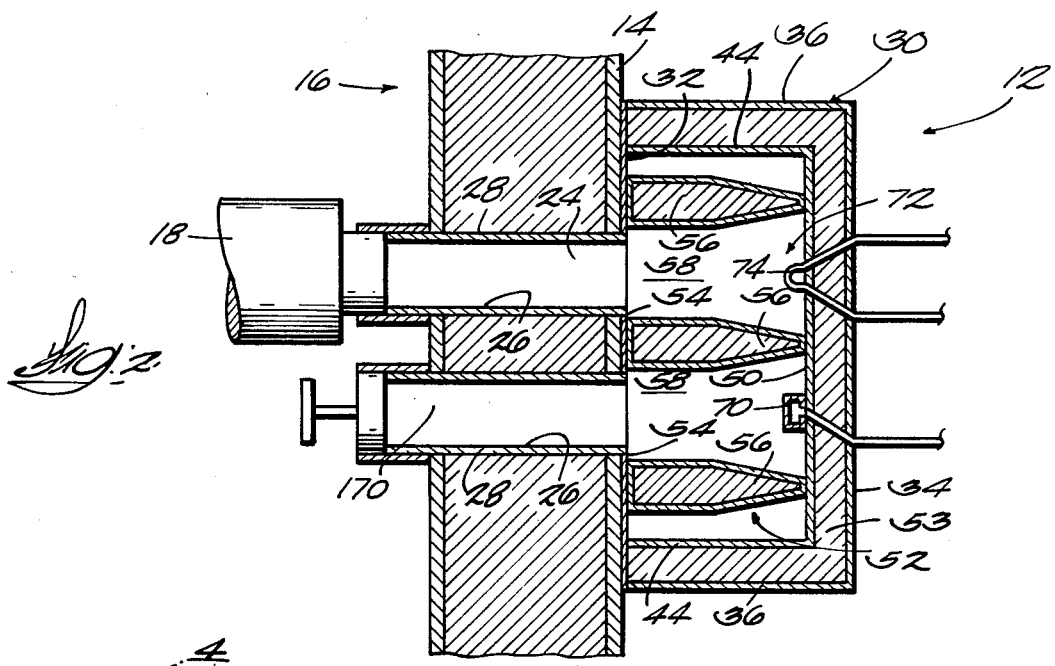
FIG. 2 is an enlarged, fragmentary, sectional view of a sample panel and cave assembly of the counting system in FIG. 1, shown with the detector and one plug in place.

Referring to FIGS. 1 and 2, a counting system 10 embodying the invention includes a cave asembly 12 mounted on the rear or back side 14 of a radiation-shielded sample panel 16 (illustrated fragmentarily) located in a sampling area in the vicinity of a nuclear reactor of a nuclear power plant for taking grab samples and in-line chemical and isotopic analysis of various radioactive fluid samples. The counting system 10 also includes a portable high purity germanium gamma ray spectrometer or detector 18, and such as an EG & G Ortec gamma gage detector, a conventional amplifier circuit 20 electrically connecting the detector 18 to a recording multichannel analyzer 22, such as an EG & G Ortec Model 7056, for recording the spectra detected by the detector 18. These data can be transferred to the main counting room for analysis on a computer system via a remote data link or recorded on a flexible diskette or the like and transferred to the counting room computer system for analysis. If desired, the output from the amplifier circuit 20 can be connected to a multichannel analyzer and computer in the counting room via a separate terminal located in the sampling area.

The sample panel 16 has sufficient shielding to protect an operator standing in front of the panel from highly radioactive post accident samples. For example, an 8-inch thick shield consisting of 1-inch steel walls and 6 inches of lead shot can be used. The detector 18 has a cylindrical detecting portion 24 and the sample panel 16 has a plurality (e.g. 5) of cylindrical openings 26 which penetrate through the panel and in which a cylindrical sleeve 28 is mounted for receiving the detecting portion 24 of the detector 18 when an analysis is to be made.

Figures 3, 4:
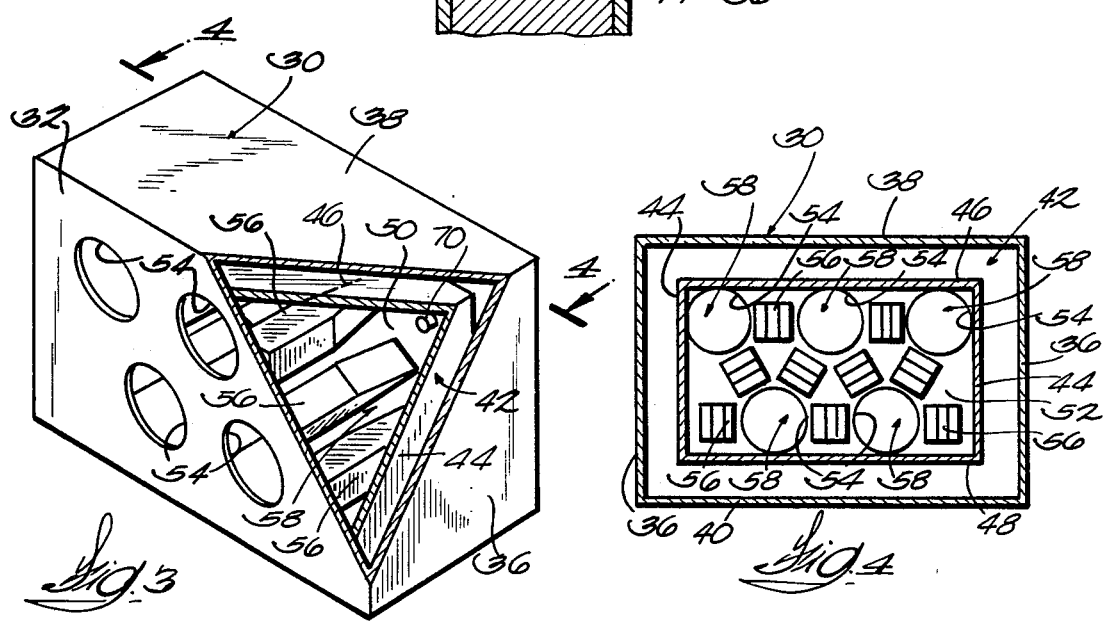
FIG. 3 is a perspective view, partially broken away, of the cave assembly.
FIG. 4 is an elevation view taken generally along line 4–4 in FIG. 3.

As best shown in FIGS. 2–4, the cave assembly 12 has an outer housing or shell 30 including a front wall 32 mounted on the rear side 14 of the sample panel 16, a rear wall 34, opposed side walls 36 and opposed top and bottom walls 38 and 40. The cave assembly 12 also includes an interior housing or shell 42 including opposed side walls 44, opposed top and bottom walls 46 and 48 and a rear wall 50, all spaced from the outer shell 30 and defining an interior chamber 52 which encloses or encompasses all the sample panel openings 28. The space between the interior and outer shells 42 and 30 is filled with lead shot 53 to provide shielding against background radiation into the chamber 52. In FIGS. 3 and 4, the lead shot has been omitted to simply illustration.

The front wall 32 of the cave assembly 12 has a plurality of circular openings 54 which are coaxial with the sample panel openings 26. Disposed in the chamber 52 and extending between the front wall 32 and the rear interior wall 50 of the cave assembly 12 are a plurality of sample port-defining members 56. As best shown in FIGS. 2–4, the members 56 are located and arranged to define radiation isolated counting ports 58 which extend through the chamber 52 generally coaxially with the front wall openings 54.

The members 56 have a generally rectangular cross section and the rear portion 60 adjacent the rear inner wall 50 preferably is wedged-shaped to minimize the streaming of radiation from one counting port 58 to another. Referring to FIG. 5, each member 56 includes a lead core 62, preferably covered with a sheet of stainless steel 64 as a structural skin. The steel sheet 64 is covered with an intermediate sheet of copper 66 and an outer sheet of cadmium 68 to minimize interference from the lead core fluorescence.

Small sample vessels for receiving samples of radioactive fluids from the nuclear reactor of a nuclear power plant are located inside the chamber 52 adjacent the inner rear wall 50 and generally centrally in the counting ports 58. In the specific embodiment illustrated, a sample vessel is centrally located in each of four of the counting ports 58 and a calibration source (not shown) is located in the other counting port 58.

The sample vessels 70 for gas samples is a small "dead end" chamber having an internal volume in the order of 1.6 cc. The sample vessels 72 for liquid samples have a hair pin-like shape with a U-shaped portion 74 located in the chamber 52 and have an internal volume in the order of 0.2 cc.

In the specific embodiment illustrated, one sample vessel 70a (FIG. 9) is provided for the analysis of the containment air from the nuclear reactor, one sample vessel 70b (FIG. 8) is provided for the analysis of the off-gas from the reactor coolant, one sample vessel 72a (FIG. 7) is provided for the analysis of de-gassed, undiluted reactant coolant and one sample vessel 72b (FIG. 6) is provided for the analysis of de-gassed, diluted reactor coolant. The reactor coolant is cooled and depressurized prior to analysis. This simplifies the fluid dynamic requirements for the sampling system. The off-gas resulting from cooling and depressurizing the reactor coolant is separated (stripped) from the liquid and the liquid and off-gas are routed in separate streams to the cave assembly 12 for independent analysis. This separate analysis of the gas and liquid minimizes interferences between important isotopes. The analysis of the two different spectra is greatly simplified and the accuracy for Xe 135 and Iodine 31 is improved by as much as 50 times over systems which analyze the reactor coolant without degassing.

FIG. 6 is a diagrammaic illustration of the control system for introducing a sample of diluted reactor coolant into the sample vessel 72b for analysis by the detector 12. The U-shaped portion 74 of the sample vessel 72b is connected to one port of a 3-way valve 75 and a drain valve 76 via respective conduits 77 and 78 which extend through the shielded rear wall of the cave assembly 12. One port of the 3-way valve 75 is connected to an eductor 80 via a conduit 82 and a shutoff valve 84. The eductor 80 is operated by opening a shutoff valve 86 which introduces a flow of nitrogen gas at a pressure in the order of 100 p.s.i. through the eductor.

Reactor coolant, which previously has been depressurized to a pressure in the order of 20–30 p.s.i., cooled to a temperature of about 100° F. and de-gassed, is introduced into a mixing chamber 88 wherein de-mineralized water is mixed therewith to provide a dilution ratio of 1,000:1. This dilution permits the detector 18 to make an analysis in the event the radioactivity of the undiluted reactor coolant is beyond the range of the detector because of an accident. One port of the 3-way valve 75 is connected to the mixing chamber 88 via a conduit 90.

Conduits 82, 77 and 78 and the sample vessel 72b are evacuated by closing the drain valve 76, moving the 3-way valve 75 to a position connecting conduits 77 and 82, opening the shutoff valve 84 with the eductor 80 operating. After evacuation has been completed, the shutoff valve 84 is closed to trap a vacuum in that portion of the system.

A sample of the diluted reactant coolant is admitted into the sample vessel 72b from the mixing chamber 88 by moving the 3-way valve 75 to a position connecting conduits 90 and 77. The reduced pressure in conduits 77 and 78 and the sample vessel 72b create the motive force for fluid transport. After the sample has been analyzed with the detector 18, the drain valve 76 is opened and the mixing chamber 88, the 3-way valve 75, conduits 90, 77 and 78, and the sample vessel 72b can be flushed with de-mineralized water or the like.

FIG. 7 is a diagrammatic illustration of a representative control system for introducing a sample of undiluted reactor coolant into the sample vessel 72a for analysis by the detector 18. This analysis is not made in the event of a worst case accident when the radioactivity of the undiluted reactor coolant has been determined to be beyond the range of the detector 18 by other detecting means.

The U-shaped portion 74 of the sample vessel 72a is connected to one port of a 3-way valve 100 and a drain valve 102 via respective conduits 104 and 106 which extend through the shielded rear wall of the cave assembly 12. One port of the 3-way valve 100 is connected to an eductor 108 via a conduit 110 and a shutoff valve 112. The eductor 108 is operated by opening a shutoff valve 114 which introduces a flow of nitrogen gas through the eductor.

The conduits 104 and 106 and the sample vessel 72a are evacuated by closing the drain valve 102, moving the 3-way valve 110 to a position connecting conduits 104 and 110, and opening the shutoff valve 112 with the eductor 108 operating. After the evacuation has been completed, the shutoff valve 112 is closed to trap a vacuum in that part of the system.

The sample of undiluted reactor coolant, which previously has been cooled to a temperature of about 100° F., de-pressurized to a pressure in the order 0.3 psia, and de-gassed, is admitted into the sample vessel 72a through a conduit 116 by moving the 3-way valve 100 to a position connecting conduits 116 and 104. The reduced pressure in conduits 104 and 106 and the sample vessel 72a create the motive for fluid transport. After the sample has been analyzed with the detector 18, the drain valve 102 is opened and conduits 116, 104 and 106 and the sample vessel 72a can be flushed with de-mineralized water or the like.

FIG. 8 is a diagrammatic illustration of the control system for introducing a sample of off-gas from the reactor coolant into sample vessel 70b. This is the gas stripped from the reactor coolant after it has been cooled and de-pressurized. The sample vessel 70b is connected to one port of a 2-way, 4-port control valve 120 via a single conduit 122 which extends through the shielded rear wall of the cave assembly 12. One port of the control valve 120 is connected to a source of the reactor coolant off-gas via a conduit 124 and an inlet valve 126. One port of the control valve 120 is connected to an eductor 128 through a conduit 130, a plenum chamber 132, a conduit 134 and shutoff valve 136. One port of the control valve 120 is connected to the eductor 128 via a conduit 138, a shutoff valve 140 and conduit 142. The eductor 128 is operated by opening a shutoff valve 144 to introduce a flow of nitrogen gas through the eductor.

The portion of the system between the inlet valve 126 and the shutoff valve 136, including conduits 124, 130 and 134 and the plenum chamber 132, is first evacuated by closing the inlet valve 126, closing the shutoff valve 140, moving the control valve to a position connecting conduits 124 and 130 and opening the shutoff valve 136 with the eductor 128 operating. After evacuation is completed, the shutoff valve 136 is closed to trap a vacuum in that part of the system.

The sample vessel 70b and conduits 122 and 138 are evacuated by moving the control valve 120 to a position connecting conduits 122 and 138 and opening the shutoff valve 140 with the eductor 128 operating. After evacuation is completed, the shutoff valve 140 is closed to trap a vacuum in that part of the system.

The reactor coolant off-gas is introduced into the plenum chamber 132 by moving the control valve 120 to a position connecting the conduits 124 and 130 and opening the inlet valve 126. The inlet valve 126 is then closed and the body of the control valve 120 holds a predetermined amount of the gas, for example, 0.023 cc. The control valve 120 is then moved to a position connecting conduits 138 and 122. The shutoff valve 140 is opened to admit atmospheric air into the conduit 138 which pushes the sample from the body of the control valve 120 into the sample vessel 70b. The control valve 120 is moved to connect conduits 124 and 120.

After the sample has been analyzed with the detector 18, the system is cleaned by first moving the control valve 120 to a position connecting conduits 122 and 138 with the eductor 128 operating. Gas in the sample vessel 70b and conduits 122 and 138 is evacuated to the atmosphere through the eductor 128. The shutoff valve 140 is then closed, the control valve 120 moved to a position connecting conduits 124 and 130 and the shutoff valve 136 is opened with the eductor 128 opening. Gas in conduits 124, 130 and 134 and the plenum chamber 132 is evacuated to atmosphere through the eductor 128.

FIG. 9 is a diagrammatic illustration of the control system for introducing a sample of the containment air from the nuclear reactor into the sample vessel 70a. The sample vessel 70a is connected to one port of a 2-way, 4-port control valve 150 via a single conduit 152 which extends through the shielded rear wall of the cave assembly 12. One port of the control valve 150 is connected to a source of the containment air via a conduit 154 and an inlet valve 156.

One port of the control valve 150 is connected to an eductor 158 via a conduit 156 and a shutoff valve 162. The eductor 158 is open to the atmosphere and is operated by opening a shutoff valve 164 to introduce a flow of nitrogen gas through the eductor. One port of the control valve 150 is connected to an eductor 166 via a conduit 168 and a shutoff valve 170. The eductor 166 is connected to a containment air return 172 and is operated by opening a shutoff valve 174 to introduce a flow of nitrogen through the eductor and the containment air return 172.

The sample vessel 70a and conduits 152 and 160 are evacuated by moving the control valve 150 to a position connecting conduits 152 and 160 and opening the shutoff valve 162 with the eductor 158 operating. After evacuation is completed, the shutoff valve 162 is closed to trap a vacuum in that portion of the system.

Containment air is flowed through the control valve 150 by moving it to a position connecting conduits 154 and 168 and opening the inlet valve 156, the shutoff valve 170, and a shutoff valve 176 in the containment air return 172 with the eductor 166 operating. After a sufficient flow to obtain a representative sample of containment air, the shutoff valve 170 is closed and the body of the control valve 150 holds a predetermined amount of containment air, for example, 0.0233 cc. The control valve 150 is moved to a position connecting conduits 152 and 160. The shutoff valve 162 is then opened to admit atmospheric air into the conduit 160 which pushes the sample from the body of the control valve 150 into the sample vessel 70a. The control valve is then moved to a position connecting conduits 154 and 168.

After the sample has been analyzed with the detector 18, the system is cleaned by first opening the shutoff valve 162 with the control valve 150 in a position connecting conduits 152 and 160 and with the eductor operating. Containment air in the sample vessel 70a and conduits 168 is evacuated to the atmosphere through the eductor 158. The shutoff valve 176 is then closed with the valve 174 open, the control valve 150 is moved to a position connecting conduits 154 and 168 and the shutoff valve 170 is opened. The eductor 166 is pressurized by virtue of the valve 174 being open and the valve 176 closed. The conduits 154 and 168 are cleaned by flowing nitrogen from the eductor 166 through valves 170, 150 and 156 back to containment.

The conduit 172 is flushed by closing the inlet valve 156 and opening the shutoff valve 176 with the eductor 166 operating.

It should be understood that specific arrangements other than those illustrated in FIGS. 6–9 can be used to provide fluid transport to and from the sample vessels, particularly the arrangement for undiluted reactor coolant.

The operator is shielded from radiation through the panel openings 26 (not being used) by removable steel coated, lead plugs 170 which fit into the sleeves 28 as illustrated in FIG. 2. In the specific embodiment illustrated, four plugs 170 are provided, one for each of the unused panel openings. As a safety feature, the outer portion of each sleeve 28 (FIG. 10) includes a L-shaped notch 172 and each plug 170 is provided with a locking lug 174 which fits into the notch 172 and locks the plug in place. Located adjacent the circumferentially extending leg of the notch 172 is an electrical microswitch 176 which is actuated by the locking lug 174 when the plug 170 is properly positioned and locked in place. The microswitches 176 are interconnected in a suitable electrical circuit arranged to provide a "go" signal only when all the plugs 170 are properly positioned.

A radionuclide analysis can be performed on any of the samples by simply moving the detector 18 from one panel opening to the other after removing a plug which is inserted into the empty opening. Since the operator's exposure to radiation is limited and a plug and the detector can be interchanged quite rapidly, two or more samples can be drawn before an analysis is made. However, a safer practice would be to draw a sample after the detector 18 has been inserted into the appropriate panel opening and to clean the sample vessel before moving the detector to another sample position.

FIGS. 11–13 illustrate a sample panel for a counting system which can be used for continuously analyzing the radioactivity of the reactor coolant during normal operation. For such use, the radioactivity is in the order of one million times less than during worst case post accident conditions. Accordingly, it is not necessary to provide a radiation shielded cave assembly behind the sample panel or the internal sample port-defining members. A gamma ray detector and analysis system like that described above can be used for the analysis. Therefore, only the sample panel itself is illustrated and described.

Referring to FIG. 11, the sampling panel 200, like the sample panel 16 described above, includes sufficient shielding to protect an operator from highly radioactive post accident samples so it can be used in conjunction with post accident sampling systems. The sample panel 200 includes a plurality of cylindrical openings 202 in which a cylindrical lead sleeve 204 is mounted for receiving the detecting portion 24 of the gamma ray detector 18 when an analysis is to be made. An annular recess 206 surrounding the opening 202 is provided in the rear of the sample panel 200 for receiving a dynamic sample vessel 208 in the form of a Marinelli-type beaker made from steel.

As best shown in FIG. 12, the sample vessel 208 has an outer cup 210 and inner cup 212 spaced radially and axially inwardly from the outer cup 210 to define a flow passage 214 therebetween having a volume of 100 cc. The inner cup 212 is dimensioned to receive the outer end of the detecting portion 24 of the detector 18. Thus, the inner cup 212 and the lead sleeve 204 cooperate to define a sample port 216. The combined length of the inner cup 212 and the sleeve 204 generally corresponds to the length of the detecting portion 24 of the detector 18. Side shine of radiation from one sampling port to another is minimized by the sleeve 204 and a lead collar 218 encircling the sample vessel 208.

In the specific embodiment illustrated, the sample panel 200 is provided with three ports 216, one for degassed, undiluted reactor coolant (the lower one in FIG. 11), one for reactor coolant off-gas (upper one in FIG. 11) and one for calibration (not shown). The calibration port includes a cup-shaped calibration source in place of a sampling vessel 208.

When an analysis of the reactor coolant is to be made during normal operation, a continuous flow of cooled, de-pressurized reactor coolant is used. The cooling and de-pressurizing of the reactor coolant generates a two-phase flow even at normal levels of dissovled gas. The gas is stripped from the liquid in a dynamic degassifier 220. Cooled, de-pressurized reactor coolant is introduced into the degassifier 220 through an inlet valve 222. The reactor coolant off-gas exits from the upper part of the degassifier 220 through a conduit 224 and the de-gassed reactor coolant exits from the lower portion of the degassifier through a conduit 226.

The sampling vessels for the reactor coolant off-gas and the liquid reactor coolant are arranged and operate in substantially the same manner, so only the sample vessel for the liquid reactor coolant will be described in detail. Referring to FIGS. 12 and 13, a continuous flow of the de-gassed reactor coolant is introduced into the sample vessel 208 through an inlet 228 centrally located in the outer cup 210. A spiral wire 230 is disposed in the space between the ends of the inner and outer cups 212 and 210 and a helical wire 232 is wound around the inner cup 212. These wires, which can be one continuous wire if desired, promotes a spiral flow of the liquid as it flows through the flow passage 214 from the inlet 228 toward an outlet 234 located in the top side of the outer cup 210.

This spiral flow flushes through any gas bubbles present in the liquid or, in the case of the off-gas sample vessel, any liquid droplets present in the off-gas. The outlet 234 for the liquid reactor coolant sample vessel is located on the top side of the outer cup 210 in order to promote the outflow of any gas bubbles in the liquid.

On the other hand, the outlet 234 for the off-gas sample vessel is located on the bottom side of the outer cup 210 in order to promote the drainage of any liquid in the gas. The outlets from both sample vessels are connected to a waste disposal line 236.

To analyze either samples stream, the detecting portion 24 of the detector 18 is simply inserted into the appropriate sample port 216 and moved from one sampling port to another.

Solid lead plugs 238 (FIG. 1) corresponding in length to the sleeves 202 are provided for insertion into all the sample ports 208 in the event of an unexpected accident. The shielding provided by the plugs 238 is equivalent to that provided by the full thickness of the sample panel 200.

Both the arrangements illustrated in FIGS. 1–10 and in FIGS. 11–13 can be incorporated into the same sample panel located near a nuclear reactor for post accident analysis if desired. The arrangement illustrated in FIGS. 1–10 could be used for post accident analysis and the arrangement illustrated in FIGS. 11–13 used in analysis during normal operation. In either case, the operator does not have to be highly skilled. That is, any technician capable of operating the portable detector 18, which normally is used at other locations in every day operations, can make both analysis.

From the above description it can be seen that the counting system provided by the invention has several advantages. It is simply constructed and yet minimizes exposure of the operator to high doses of radiation. The sample-to-detector geometry is maintained between ports which means that the calibration of the detector is maintained. The sample positions are fixed which increases mechanical reliability. The control systems for transporting the fluid samples to a sample position employ simple, reliable components. In the embodiment adapted for use in post accident analysis, the individual sampling ports are isolated from each other by port defining members which are arranged to minimize radiation shine from one port to another (especially below the 1000 Kev range), minimize front-scatter streaming or channeling toward the detector face, and minimize lead fluorscence interference. The portable detector is not dedicated to the sample panel and is available for use in post accident analysis, normal operation analysis and even in the counting room for routine analysis if desired.

From the foregoing description, one skilled in the art can easily ascertain the essential characteristics of the invention and, without departing from the spirit and scope thereof, can make various changes and modifications to adapt it to various usages and conditions.

We claim:

1. A counting system for radioactive fluids including
a portable gamma ray detector having a detecting portion;
a radiation shielded panel having front and rear sides and including a plurality of openings extending therethrough, each of said panel openings being adapted to physically receive the detecting portion of said detector;
a vessel for receiving a radioactive fluid sample associated with at least one of said panel openings and located behind said panel coaxially with said panel opening;
means for selectively introducing a radioactive fluid into said sample vessel;
means for electrically connecting said detector to instrumentation for analyzing the radioactivity of a radioactive fluid, whereby the radioactivity of a radioactive fluid contained in each of said sample vessels can be selectively determined by inserting the detecting portion of said detector into the corresponding panel opening; and
radiation shielded plugs adapted to be inserted into each of said panel openings other than the one in which said detector is inserted.

2. A counting system according to claim 1 including
at least four of said panel openings;
a said sample vessel associated with each of said panel openings;
means for selectively introducing a sample of degassed undiluted nuclear reactor coolant into one of said sample vessels;
means for selectively introducing a sample of degassed, diluted nuclear reactor coolant into one of said sample vessels;
means for selectively introducing a sample of nuclear reactor coolant off-gas into one of said sample vessels; and
means for selectively introducing a sample of nuclear reactor containment air into one of said sample vessels.

3. A counting system according to claim 1 including
at least two of said panel openings;
a said sample vessel associated with each of said panel openings,
means for selectively introducing a continous flow of degassed, undiluted nuclear reactor coolant into one of said sample vessels; and
means for selectively introducing a continuous flow of nuclear reactant coolant off-gas into one of said sample vessels.

4. A counting system according to claim 2 including
a radiation shielded cave assembly mounted on the rear side of said panel and having an interior shell including side walls and a rear wall defining a rearwardly extending, radiation shielded chamber encompassing said panel openings;
a plurality of radiation shielded members extending rearwardly through said chamber towards said rear wall and arranged to define radiation isolated sampling ports inside said chamber, each of said sampling ports being coaxial with a said panel opening; and a said sampling vessel generally centrally located in each of said sampling ports adjacent said chamber rear wall.

5. A counting system according to claim 4 wherein the rear portion of said members is rearwardly wedged-shaped so as to minimize streaming of radiation from one of said ports to another.

6. A counting system according to claim 5 wherein said members include a lead core covered with a intermediate sheet of copper and an outer sheet of cadmium to minimize interference from lead fluorscence from said core.

7. A counting system according to claim 2 wherein said sample vessels for the diluted and undiluted reactor coolant includes a U-shaped portion located in said chamber and into which the sample is introduced for detection by said detector.

8. A counting system according to claim 2 wherein said sample vessels for the reactor coolant off-gas and the containment air includes a small "dead end" compartment located in said chamber and into which the sample is introduced for detection by said detector.

9. A counting system according to claim 3 wherein said sample vessels are in the form of a Marinelli-type beaker mounted on the rear side of said panel and cooperating with a said panel opening to form a sampling port for receiving the detecting portion of said detector.

10. A counting system according to claim 9 wherein said beaker includes an outer cup;

an inner cup adapted to receive the outer end of the detecting portion of said detector and spaced inwardly from said outer cup to define a flow passage therebetween;

an inlet in the outer end of said outer cup through which a continuous flow of a sample is introduced into said flow passage;

an outlet in the side of said outer cup through which the sample is discharged from said flow passage; and means in said flow passage for promoting a spiral flow from said inlet to said outlet.

11. A counting system according to claim 10 wherein said outlet on said sample vessel for the reactor coolant off-gas is located on a lowermost portion of said outer cup to promote drainage of liquid from said flow passage.

12. A counting system according to claim 11 wherein said outlet on said sample vessel for the reactor coolant is located on an uppermost portion of said outer cup to promote venting of gas from said flow passage.

* * * * *